United States Patent
Han et al.

(10) Patent No.: US 10,915,720 B2
(45) Date of Patent: Feb. 9, 2021

(54) SERVICE PROCESSING METHOD, DEVICE AND APPARATUS

(71) Applicant: ADVANCED NEW TECHNOLOGES CO., LTD., Grand Cayman (KY)

(72) Inventors: Zhe Han, Hangzhou (CN); Jun Wu, Hangzhou (CN); Feng Lin, Hangzhou (CN)

(73) Assignee: ADVANCED NEW TECHNOLOGIES CO., LTD., Grand Cayman (KY)

(*) Notice: Subject to any disclaimer, the term of this patent is extended or adjusted under 35 U.S.C. 154(b) by 0 days.

(21) Appl. No.: 16/888,833

(22) Filed: May 31, 2020

(65) Prior Publication Data

US 2020/0293732 A1 Sep. 17, 2020

Related U.S. Application Data

(63) Continuation of application No. PCT/CN2019/073847, filed on Jan. 30, 2019.

(30) Foreign Application Priority Data

Apr. 25, 2018 (CN) .......................... 2018 1 0380054

(51) Int. Cl.
*G06K 7/10* (2006.01)
*H04W 76/14* (2018.01)
(Continued)

(52) U.S. Cl.
CPC ....... *G06K 7/10722* (2013.01); *G06K 7/1417* (2013.01); *H04W 4/80* (2018.02); *H04W 76/14* (2018.02); *H04W 88/02* (2013.01)

(58) Field of Classification Search
CPC ... G06K 7/10722; G06K 7/1417; H04W 4/80; H04W 76/14; H04W 88/02
(Continued)

(56) References Cited

U.S. PATENT DOCUMENTS

| 7,941,096 B2 | 5/2011 | Perkins et al. |
| 8,090,359 B2 * | 1/2012 | Proctor, Jr. ........ G06Q 30/0242 455/414.3 |

(Continued)

FOREIGN PATENT DOCUMENTS

| CN | 101482948 A | 7/2009 |
| CN | 104540088 A | 4/2015 |

(Continued)

OTHER PUBLICATIONS

First Search for Chinese Application No. 201810380054.3 dated Jan. 8, 2020.

(Continued)

*Primary Examiner* — William Nealon

(57) ABSTRACT

A method: broadcasting a first message comprising an apparatus type through near field communication; scanning a digital object identifier (DOI) that is displayed by a mobile terminal according to the first message and that matches the apparatus type, to obtain service information and identity information of the mobile terminal included in the DOI; broadcasting a second message generated based on the identity information; obtaining, from the mobile terminal, a request for a near field communication connection, the request being generated by the mobile terminal after the mobile terminal determines the second message includes information consistent with the identity information of the mobile terminal; verifying the request based on the identity information of the mobile terminal; in response to that the verification succeeds, establishing the near field communication connection to the mobile terminal; and executing a service through the near field communication connection according to the service information.

18 Claims, 10 Drawing Sheets

(51) Int. Cl.
*H04W 4/80* (2018.01)
*H04W 88/02* (2009.01)
*G06K 7/14* (2006.01)

(58) Field of Classification Search
USPC .......................................................... 455/411
See application file for complete search history.

(56) References Cited

U.S. PATENT DOCUMENTS

| | | | |
|---|---|---|---|
| 8,368,540 B2 | 2/2013 | Perkins et al. | |
| 8,413,884 B2 * | 4/2013 | Lim | G06Q 30/02 |
| | | | 235/375 |
| 8,627,075 B2 | 1/2014 | Ikeda et al. | |
| 8,764,571 B2 | 7/2014 | Sarmenta | |
| 8,798,534 B2 | 8/2014 | Rodriguez et al. | |
| 8,813,182 B2 | 8/2014 | Griffin et al. | |
| 9,008,353 B2 | 4/2015 | Aller | |
| 9,094,719 B2 | 7/2015 | Davis et al. | |
| 9,125,004 B2 | 9/2015 | Kamal et al. | |
| 9,183,580 B2 | 11/2015 | Rhoads et al. | |
| 9,351,164 B2 | 5/2016 | Nieuwenhuyze et al. | |
| 9,361,606 B2 | 6/2016 | Hertel et al. | |
| 9,411,762 B2 | 8/2016 | Natu et al. | |
| 9,542,681 B1 | 1/2017 | Borovsky et al. | |
| 10,050,959 B2 | 8/2018 | Soon-Shiong et al. | |
| 10,103,784 B2 | 10/2018 | Leica et al. | |
| 10,242,356 B2 | 3/2019 | Shah | |
| 10,404,678 B2 | 9/2019 | Grajek et al. | |
| 2013/0303085 A1 | 11/2013 | Boucher et al. | |
| 2014/0304381 A1 | 10/2014 | Savolainen et al. | |
| 2014/0342670 A1* | 11/2014 | Kang | H04M 1/7253 |
| | | | 455/41.2 |
| 2014/0357312 A1 | 12/2014 | Davis et al. | |
| 2015/0077228 A1 | 3/2015 | Dua | |
| 2015/0163345 A1 | 6/2015 | Cornaby et al. | |
| 2015/0195673 A1* | 7/2015 | Rantapuska | H04L 67/16 |
| | | | 455/3.05 |
| 2015/0254677 A1 | 9/2015 | Nelson-Huxham et al. | |
| 2016/0080943 A1* | 3/2016 | Ives-Halperin | H04L 63/0861 |
| | | | 713/168 |
| 2016/0342974 A1 | 11/2016 | Feng et al. | |
| 2018/0242252 A1* | 8/2018 | Viswanadham | H04W 52/0229 |
| 2019/0026768 A1* | 1/2019 | Coli | G06Q 20/204 |
| 2019/0057067 A1 | 2/2019 | Soon-Shiong et al. | |
| 2019/0266592 A1 | 8/2019 | Shen et al. | |

FOREIGN PATENT DOCUMENTS

| | | |
|---|---|---|
| CN | 106296152 A | 1/2017 |
| CN | 107038569 A | 8/2017 |
| CN | 107491959 A | 12/2017 |
| CN | 107578245 A | 1/2018 |
| CN | 107733532 A | 2/2018 |
| CN | 108764392 A | 11/2018 |
| JP | 2005038102 A | 2/2005 |

OTHER PUBLICATIONS

PCT International Search Report and the Written Opinion dated Apr. 28, 2019, issued in related International Application No. PCT/CN2019/073847 (10 pages).

* cited by examiner

SERVICE PROCESSING METHOD, DEVICE AND APPARATUS

CROSS-REFERENCE TO RELATED APPLICATIONS

This application is a continuation application of International Application No. PCT/CN2019/073847, filed on Jan. 30, 2019, which claims priority to the Chinese Application No. 201810380054.3, filed on Apr. 25, 2018 and entitled "SERVICE PROCESSING METHOD, DEVICE AND APPARATUS," all of which are incorporated herein by reference in their entirety.

TECHNICAL FIELD

The application relates to the technical field of computer software, and in particular, to a service processing method, device, and apparatus.

BACKGROUND

Popularity of smartphones brings convenience to human life. Various services can be executed accordingly using various applications on a smartphone.

Currently, QR codes are widely used in applications on a smartphone, such as making a payment, exchanging business cards, and retrieving movie tickets using QR codes. Correspondingly, each user usually has a plurality of QR codes for different purposes. Even a same application may provide a user with multiple QR codes. The user needs to understand an exact purpose of each QR code to correctly use the QR codes.

Based on the existing technologies, a more convenient solution for a user to use OR codes is required.

SUMMARY

Embodiments of the specification provide a service processing method, device, and apparatus to resolve the following technical problem: a more convenient QR code using solution is required.

In order to resolve the technical problem, the embodiments of the specification are implemented as follows.

An embodiment of the specification provides a first service processing method, including: broadcasting a first message including an apparatus type through near field communication; scanning a digital object identifier (DOI) that is displayed by a mobile terminal according to the first message and that matches the apparatus type, to obtain service information and identity information of the mobile terminal that are included in the DOI; broadcasting a second message reflecting the identity information; after the mobile terminal determines, according to the second message, that there is identity consistency, verifying the identity information of the mobile terminal during establishment of a near field communication connection to the mobile terminal, and after the verification succeeds, completing the establishment of the connection; and executing a service through the connection according to the service information.

An embodiment of the specification provides a second service processing method, including: determining an electronic device with a strongest broadcasting signal by means of scanning through near field communication; receiving a first message broadcast by the electronic device to determine an apparatus type of the electronic device; determining a DOI matching the apparatus type, and displaying or instructing a user to display the DOI, the DOI including service information and identity information; receiving a second message reflecting the identity information broadcast by the electronic device after scanning the DOI; determining whether there is identity consistency according to the second message, if there is identity consistency, starting to establish a near field communication connection to the electronic device, and after verification performed by the electronic device on identity information of a mobile terminal succeeds, completing the establishment of the connection; and executing a service through the connection according to the service information.

An embodiment of the specification provides a third service processing method, including: scanning a DOI displayed by a mobile terminal to obtain identity information of the mobile terminal included in the DOI; broadcasting a message reflecting the identity information; after the mobile terminal determines, according to the message, that there is identity consistency, verifying the identity information of the mobile terminal during establishment of a near field communication connection to the mobile terminal, and after the verification succeeds, completing the establishment of the connection; and receiving a plurality of DOIs sent by the mobile terminal through the connection; and determining a matched DOI from the plurality of DOIs for executing a service.

An embodiment of the specification provides a fourth service processing method, including: displaying a DOI including identity information; receiving message reflecting the identity information broadcast by an electronic device through scanning of the DOI; determining whether there is identity consistency according to the message, if there is identity consistency, starting to establish a near field communication connection to the electronic device, and after verification performed by the electronic device on the identity information succeeds, completing the establishment of the connection; and sending a plurality of DOIs to the electronic device through the connection for the electronic device to determine a matched DOI from the plurality of DOIs for executing a service.

An embodiment of the specification provides a first service processing device, including: a first broadcasting module configured to broadcast a first message including an apparatus type through near field communication; a scanning module configured to scan a DOI that is displayed by a mobile terminal according to the first message and that matches the apparatus type, to obtain service information and identity information of the mobile terminal that are included in the DOI; a second broadcasting module configured to broadcast a second message reflecting the identity information; a connecting module configured to: after the mobile terminal determines, according to the second message, that there is identity consistency, verify the identity information of the mobile terminal during establishment of a near field communication connection to the mobile terminal, and after the verification succeeds, complete the establishment of the connection; and a service module configured to execute a service through the connection according to the service information.

An embodiment of the specification provides a second service processing device, including: a first determining module configured to determine an electronic device with a strongest broadcasting signal by means of scanning through near field communication; a first receiving module configured to receive a first message broadcast by the electronic device to determine an apparatus type of the electronic device; a second determining module configured to determine a DOI matching the apparatus type, and display or instruct a user to display the DOI, the DOI including service information and identity information; a second receiving module configured to receive a second message reflecting the identity information broadcast by the electronic device after scanning the DOI; a connecting module configured to: determine whether there is identity consistency according to the second message, if there is identity consistency, start to establish a near field communication connection to the electronic device, and after verification performed by the electronic device on identity information of a mobile terminal succeeds, complete the establishment of the connection; and a service module configured to execute a service through the connection according to the service information.

An embodiment of the specification provides a third service processing device, including: a scanning module configured to scan a DOI displayed by a mobile terminal to obtain identity information of the mobile terminal included in the DOI; a broadcasting module configured to broadcast a message reflecting the identity information; a connecting module configured to: after the mobile terminal determines, according to the message, that there is identity consistency, verify the identity information of the mobile terminal during establishment of a near field communication connection to the mobile terminal, and after the verification succeeds, complete the establishment of the connection; and a receiving module configured to receive a plurality of DOIs sent by the mobile terminal through the connection; and a service module configured to determine a matched DOI from the plurality of DOIs for executing a service.

An embodiment of the specification provides a fourth service processing device, including: a displaying module configured to display a DOI including identity information; a receiving module configured to receive a message reflecting the identity information broadcast by an electronic device through scanning of the DOI; a connecting module configured to: determine whether there is identity consistency according to the message, if there is identity consistency, start to establish a near field communication connection to the electronic device, and after verification performed by the electronic device on the identity information succeeds, complete the establishment of the connection; and a sending module configured to send a plurality of DOIs to the electronic device through the connection for the electronic device to determine a matched DOI from the plurality of DOIs for executing a service.

An embodiment of the specification provides a first service processing apparatus, including: at least one processor; and a memory communicatively connected to the at least one processor. The memory stores instructions executable by the at least one processor, where execution of the instructions by the at least one processor causes the at least one processor to: broadcast a first message including an apparatus type through near field communication; scan a DOI that is displayed by a mobile terminal according to the first message and that matches the apparatus type, to obtain service information and identity information of the mobile terminal that are included in the DOI; broadcast a second message reflecting the identity information; after the mobile terminal determines, according to the second message, that there is identity consistency, verify the identity information of the mobile terminal during establishment of a near field communication connection to the mobile terminal, and after the verification succeeds, complete the establishment of the connection; and execute a service through the connection according to the service information.

An embodiment of the specification provides a second service processing apparatus, including: at least one processor and a memory communicatively connected to the at least one processor. The memory stores instructions executable by the at least one processor, where execution of the instructions by the at least one processor causes the at least one processor to: determine an electronic device with a strongest broadcasting signal by means of scanning through near field communication; receive a first message broadcast by the electronic device to determine an apparatus type of the electronic device; determine a DOI matching the apparatus type, and display or instruct a user to display the DOI, the DOI including service information and identity information; receive a second message reflecting the identity information broadcast by the electronic device after scanning the DOI; determine whether there is identity consistency according to the second message, if there is identity consistency, start to establish a near field communication connection to the electronic device, and after verification performed by the electronic device on identity information of a mobile terminal succeeds, complete the establishment of the connection; and execute a service through the connection according to the service information.

An embodiment of the specification provides a third service processing apparatus, including: at least one processor and a memory communicatively connected to the at least one processor. The memory stores instructions executable by the at least one processor, where execution of the instructions by the at least one processor causes the at least one processor to: scan a DOI displayed by a mobile terminal to obtain identity information of the mobile terminal included in the DOI; broadcast a message reflecting the identity information; after the mobile terminal determines, according to the message, that there is identity consistency, verify the identity information of the mobile terminal during establishment of a near field communication connection to the mobile terminal, and after the verification succeeds, complete the establishment of the connection; and receive a plurality of DOIs sent by the mobile terminal through the connection; and determine a matched DOI from the plurality of DOIs for executing a service.

An embodiment of the specification provides a fourth service processing apparatus, including: at least one processor and a memory communicatively connected to the at least one processor. The memory stores instructions executable by the at least one processor, where execution of the instructions by the at least one processor causes the at least one processor to: display a DOI including identity information; receive a message reflecting the identity information broadcast by an electronic device through scanning of the DOI; determine whether there is identity consistency according to the message, if there is identity consistency, start to establish a near field communication connection to the electronic device, and after verification performed by the electronic device on the identity information succeeds, complete the establishment of the connection; and send a plurality of DOIs to the electronic device through the connection for the electronic device to determine a matched DOI from the plurality of DOIs for executing a service.

In a further aspect, a service processing method is provided. According to one embodiment, the method includes: broadcasting, by an electronic device, a first message comprising an apparatus type through near field communication; scanning, by the electronic device, a digital object identifier (DOI) that is displayed by a mobile terminal according to the first message and that matches the apparatus type, to obtain service information and identity information of the mobile terminal included in the DOI; broadcasting, by the electronic device, a second message generated based on the identity information; obtaining, by the electronic device from the mobile terminal, a request for a near field communication connection, the request being generated by the mobile terminal after the mobile terminal determines the second message includes information consistent with the identity information of the mobile terminal; verifying, by the electronic device, the request based on the identity information of the mobile terminal; in response to that the verification succeeds, establishing, by the electronic device, the near field communication connection to the mobile terminal; and executing, by the electronic device, a service through the near field communication connection according to the service information.

In some embodiments, the broadcasting, by the electronic device, a second message generated based on the identity information includes: encrypting, by the electronic device, the identity information included in the DOI to obtain a characteristic value reflecting the identity information; and broadcasting, by the electronic device, the second message that includes the characteristic value.

In some embodiments, the near field communication connection is established based on Bluetooth Low Energy (BLE) protocol, and the identity information of the mobile terminal comprises a Bluetooth physical address.

In some embodiments, the mobile terminal is in a master mode of the BLE protocol.

In some embodiments, the DOI comprises a QR code.

In some embodiments, the executing, by the electronic device, a service through the near field communication connection according to the service information includes: obtaining, by the electronic device, a plurality of DOIs from the mobile terminal via the near field communication connection; and selecting, by the electronic device, one of the DOIs that is consistent with the service provided by the electronic device; and executing, by the electronic device, the service based on the selected DOI.

In another aspect, a service processing apparatus is provided. According to one embodiment, the apparatus includes one or more processors and a memory storing instructions executable by the one or more processors to cause the one or more processors to perform operations including: broadcasting a first message comprising an apparatus type through near field communication; scanning a digital object identifier (DOI) that is displayed by a mobile terminal according to the first message and that matches the apparatus type, to obtain service information and identity information of the mobile terminal included in the DOI; broadcasting a second message generated based on the identity information; obtaining, from the mobile terminal, a request for a near field communication connection, the request being generated by the mobile terminal after the mobile terminal determines the second message includes information consistent with the identity information of the mobile terminal; verifying the request based on the identity information of the mobile terminal; in response to that the verification succeeds, establishing the near field communication connection to the mobile terminal; and executing a service through the near field communication connection according to the service information.

In another aspect, one or more non-transitory computer-readable storage media are provided. The one or more non-transitory computer-readable storage media are configured with instructions executable by one or more processors to cause the one or more processors to perform operations including: broadcasting a first message comprising an apparatus type through near field communication; scanning a digital object identifier (DOI) that is displayed by a mobile terminal according to the first message and that matches the apparatus type, to obtain service information and identity information of the mobile terminal included in the DOI; broadcasting a second message generated based on the identity information; obtaining, from the mobile terminal, a request for a near field communication connection, the request being generated by the mobile terminal after the mobile terminal determines the second message includes information consistent with the identity information of the mobile terminal; verifying the request based on the identity information of the mobile terminal; in response to that the verification succeeds, establishing the near field communication connection to the mobile terminal; and executing a service through the near field communication connection according to the service information.

In another aspect, a method for service processing includes: determining, by a mobile terminal, an electronic device with a strongest broadcasting signal by scanning with near field communication; receiving, by the mobile terminal, a first message from the electronic device to determine an apparatus type of the electronic device; determining, by the mobile terminal, a digital object identifier (DOI) matching the apparatus type; displaying, by the mobile terminal, the DOI, the DOI comprising service information and identity information of the mobile terminal; receiving, by the mobile terminal, a second message broadcast by the electronic device after the electronic device scans the DOI, the second message including information indicating identity information; determining, by the mobile terminal, whether the information indicating identity information included in the second message is consistent with the identity information of the mobile terminal; in response to determining that the information indicating identity information included in the second message is consistent with the identity information of the mobile terminal, establishing, by the mobile terminal, a near field communication connection to the electronic device; and transmitting, by the mobile terminal, a service request including the service information to the electronic device via the near field communication connection to enable the electronic device to execute a service based on the service information.

In some embodiments, the electronic device is in a slave mode of the BLE protocol.

The at least one technical solution adopted in the embodiments of the specification can achieve the following beneficial effects: Even if a user has a plurality of QR codes, a mobile terminal of the user may adaptively display a QR code matching a current service, or the mobile terminal sends the plurality of QR codes to an electronic device, and the electronic device can adaptively select the QR code matching the current service, helping prevent the user from being confused when using the QR codes, thereby reducing difficulty of user operation, which is relatively convenient. In addition, the mobile terminal and the electronic device perform identity verification on each other, not only improving security when using the QR code but also helping prevent a user from practicing fraud when using the QR code.

BRIEF DESCRIPTION OF THE DRAWINGS

To describe the technical solutions in the embodiments of the specification or in the existing technologies more clearly, the following briefly introduces the accompanying drawings required for describing the embodiments or the prior art.

Apparently, the accompanying drawings in the following description show merely some embodiments of the specification, and a person of ordinary skill in the art may still derive other drawings from these accompanying drawings without creative efforts.

DETAILED DESCRIPTION OF THE EMBODIMENTS

Embodiments of the specification provide a service processing method, device, and apparatus.

To make a person skilled in the art understand the technical solutions in the specification better, the following clearly and completely describes the technical solutions in the embodiments of the specification with reference to the accompanying drawings in the embodiments of the specification. Apparently, the described embodiments are merely some but not all of the embodiments of the present application. All other embodiments obtained by persons of ordinary skill in the art based on the embodiments of the specification without creative efforts shall fall within the protection scope of the specification.

A mobile terminal and a machine are used in the solutions of the specification. A mobile terminal includes devices such as mobile phones, tablet computers, smart watches, smart bracelets used by users and related software on the apparatuses, such as payment application clients, instant messaging application clients, etc. A machine (e.g., an electronic device) includes, for example, subway gates, bus code scanners, automatic ticket purchase machines, automatic ticket collection machines, cash registers, etc. of a service provider opposite to a user. The solutions of the specification may be applied to a variety of scenarios, for example, a scenario in which a user passes through a subway gate, takes a bus, purchases a ticket, collects a ticket, pays a bill using a QR code, etc.

Figure 1:
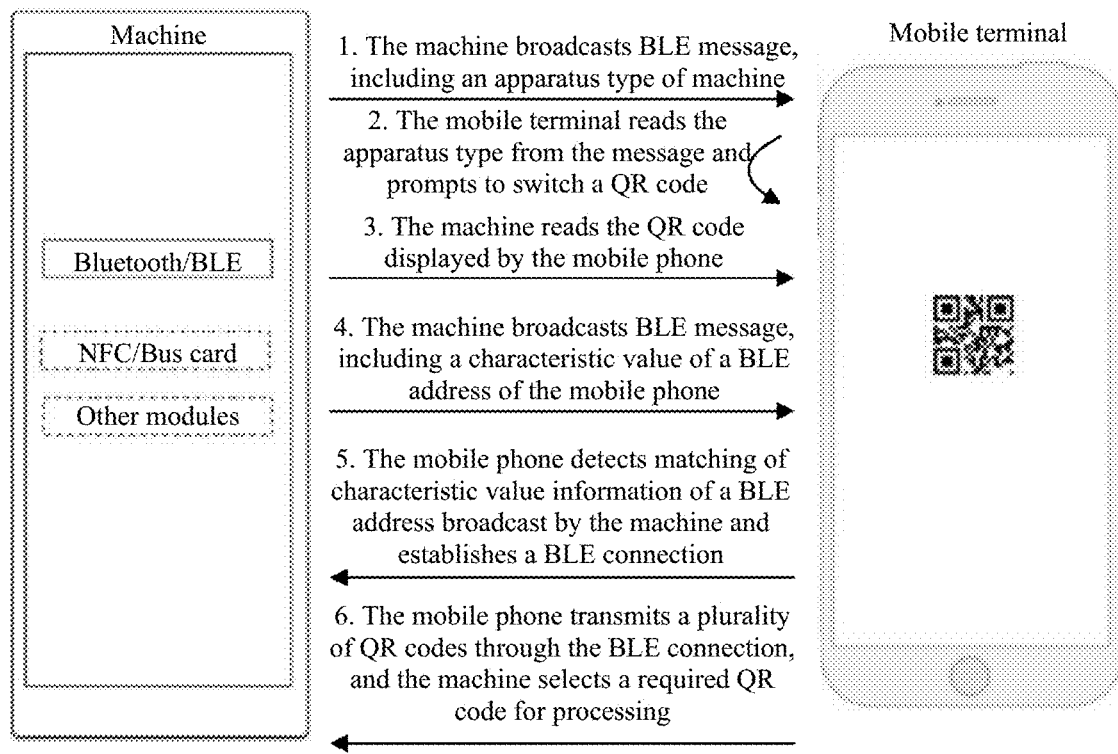
FIG. 1 is a flow diagram of a solution according to an embodiment the specification.

FIG. 1 is a schematic principle diagram of a solution of the specification in an actual application scenario. In this actual application scenario, the mobile terminal is specifically a mobile phone, and the machine is specifically a subway gate or a bus code scanner.

The machine performs broadcasting through Bluetooth low energy (BLE). The message includes an apparatus type of the machine. The mobile phone reads the message, and correspondingly prompts switching of a QR code according to the apparatus type and displays the QR code to the machine. The machine reads the QR code displayed by the mobile phone. The QR code includes a BLE address (that is, a Bluetooth physical address) of the mobile phone. The machine calculates a characteristic value of the BLE address and adds the characteristic value to the message. When the mobile phone detects that the characteristic value of the BLE address broadcast by the machine is consistent with a characteristic value of the mobile phone, the mobile phone establishes a BLE connection. After the connection is established, the mobile phone may send a plurality of QR codes to the machine through the BLE connection, and the machine may select a required QR code for processing.

The solutions of the specification are described in detail based on the above principles.

Figure 2:
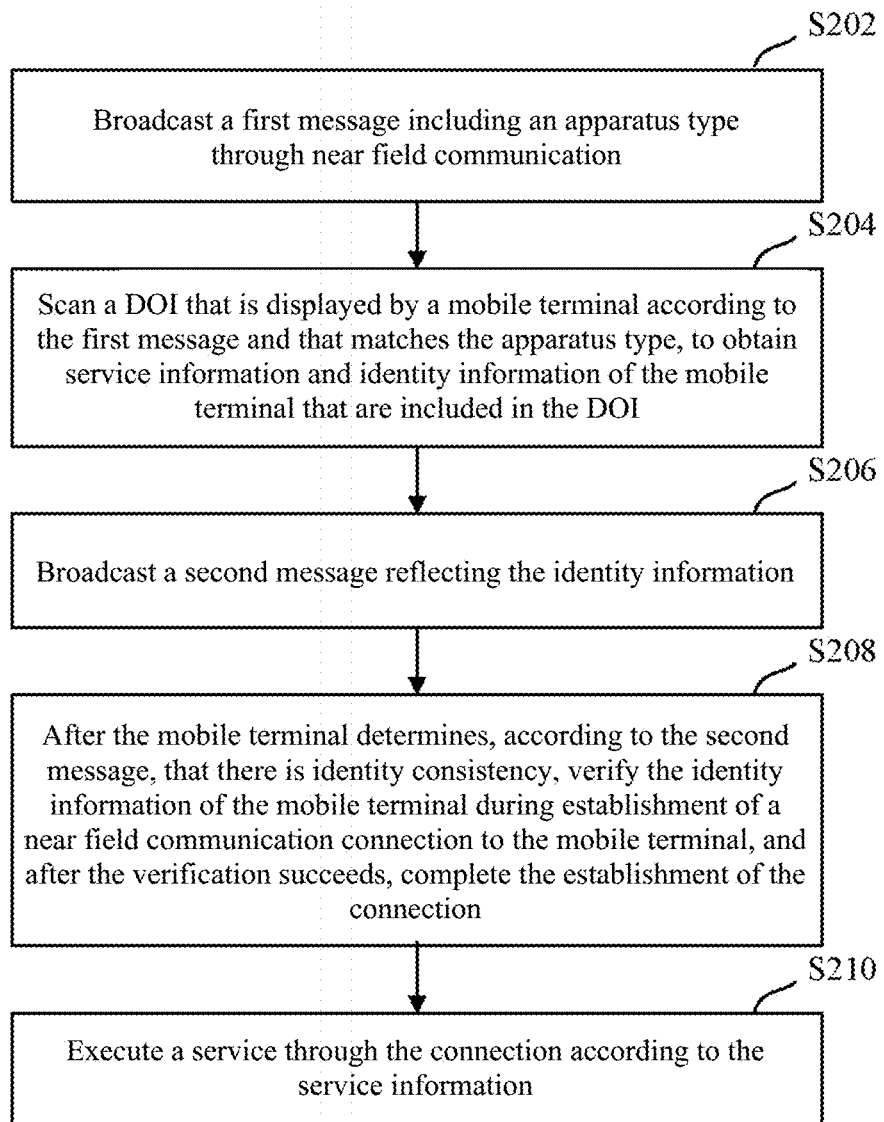
FIG. 2 is a flowchart of a service processing method from a perspective of a machine, according to an embodiment of the specification.

FIG. 2 is a schematic flowchart of a first service processing method from a perspective of a machine, according to an embodiment of the specification. An execution body is the machine and related software on the machine. The process may include the following steps.

S202: A first message including an apparatus type is broadcast through near field communication.

In this embodiment of the specification, the near field communication may be BLE. In this case, broadcasting means BLE broadcasting. The BLE technology is a low-cost, near field, interoperable, robust wireless technology that operates in the license-free 2.4 GHz Industrial Scientific Medical (ISM) radio frequency band. The BLE technology is designed as an ultra-low-power wireless technology from the beginning, in which many intelligent methods are used to minimize power consumption. In offline mobile payment scenarios, the BLE technology can improve convenience and reliability of operation, and requires relatively low energy consumption from users and merchants, and has relatively good applicability.

Certainly, near field communication is not limited to BLE. For example, the near field communication may also be Wi-Fi, ultra-wideband (UWB), home radio frequency (home RF), and other manners. During implementation of the solutions, a suitable near field communication manner may be selected according to actual conditions.

S204: A DOI that is displayed by a mobile terminal according to the first message and that matches the apparatus type is scanned to obtain service information and identity information of the mobile terminal that are included in the DOI.

In this embodiment of the specification, the DOI is, for example, digital information that may be identified through scanning, such as a QR code, a bar code, or a web address, etc. For the background and many similar service scenarios, the DOI mainly refers to a QR code, and some embodiments of the specification are also described mainly using this case as an example.

In this embodiment of the specification, self refers to an execution body of a current step. An apparatus type may be used to determine a DOI with which an apparatus matches. The apparatus needs to execute a service according to at least service information included in the DOI with which the apparatus matches.

For example, if there are currently three different three-dimensional codes. The first QR code is used for take a subway, the second QR code is used for taking a bus, and the third QR code is used for payment after consumption in a store. In this case, the apparatus types may include at least three types: metro gate, bus scanner, and cash register. Correspondingly, the first QR code matches the metro gate, the second QR code matches the bus scanner, and the third QR code matches the cash register. In actual application, if necessary, the apparatus type may be further subdivided. For example, for Beijing Metro and Shanghai Metro, if different QR codes are required to pass through the metro gates respectively, Beijing metro gate and Shanghai metro gate may be used as different apparatus types respectively.

In this embodiment of the specification, the mobile terminal may automatically perform monitoring to receive a message of the machine, or may perform monitoring when a user actively performs triggering (for example, the user opens a corresponding service page). When there are a plurality of machines nearby broadcasting first messages, the mobile terminal may automatically select a machine with a strongest broadcast signal for a subsequent action. Certainly, the user may also manually select the machine. In addition, in actual application, the mobile terminal usually keeps moving, and broadcasting signal strength of the machine changes. Currently, a machine A has a strongest broadcasting signal, but after a while, a machine B may have a strongest broadcasting signal. In this case, the mobile terminal may correspondingly switch a displayed DOI according to a current machine with a strongest broadcasting signal.

Further, the mobile terminal may automatically display a matched DOI, or may give a prompt to a user first, and then display the matched DOI after confirmation by the user.

In this embodiment of the specification, the DOI displayed by the mobile terminal to the machine includes identity information of the mobile terminal. The identity information may be a software identifier or a hardware identifier of the mobile terminal, such as a Bluetooth physical address, a Wi-Fi physical address, an international mobile equipment identity (IMEI), a user-defined name, etc. The identity information may also be password information provided by the mobile terminal for identity verification, such as a digital signature, a verification code, a key, etc. The DOI may further include service information used for the machine to execute a service that implements a function of the machine. For example, for a metro gate, the service information included in the matched DOI may be information about an electronic metro ticket or payment account information used to pay for the metro ticket, etc.

S206: A second message reflecting the identity information is broadcast.

In this embodiment of the specification, after the machine reads the QR code to obtain the identity information of the mobile terminal, the machine may add corresponding content to the broadcasting. The corresponding content may be identity information. Alternatively, in order to prevent leakage of the identity information, a cryptographic operation may be performed on the identity information to obtain a characteristic value reflecting the identity information as the corresponding content.

S208: After the mobile terminal determines, according to the second message, that there is identity consistency, the identity information of the mobile terminal is verified during establishment of a near field communication connection to the mobile terminal, and after the verification succeeds, the establishment of the connection is completed.

In this embodiment of the specification, the second message is used by the mobile terminal to determine whether there is identity consistency. In other words, the mobile terminal determines, based on the identity information of the mobile terminal reflected in the second message, whether the machine that broadcasts the second message is a machine to which the mobile terminal displays the DOI. If identity information included in the second message is exactly the identity information of the mobile terminal, there is identity consistency, and the mobile terminal may perform subsequent interaction with the machine. Otherwise, there is no identity consistency, and the machine is an incorrect interaction object for the current mobile terminal. In this case, the mobile terminal may refuse to perform subsequent interaction with the machine.

In this embodiment of the specification, the near field communication in steps S202 and S208 may be performed in a same manner, or may be performed in different manners respectively.

In this embodiment of the specification, during establishment of the near field communication connection, the machine may obtain true identity information of the mobile terminal, and then may verify the identity information of the mobile terminal, helping prevent a user from practicing fraud. For example, if the user steals a DOI of others, identity verification fails. If the verification fails, the machine may refuse to establish a connection to the mobile terminal and to execute a service.

S210: A service is executed through the connection according to the service information.

In this embodiment of the specification, the service is, for example, payment, ticket check, ticket issue, etc., which depends on use of the machine.

In this embodiment of the specification, the machine may write back information to the mobile terminal through the connection, so that even if the mobile terminal is offline, the feedback information of a service processing status can be obtained in time. Certainly, even if both the machine and the mobile terminal are offline, services can be executed normally based on the connection, thereby bringing convenience to the machine side and the user.

In this embodiment of the specification, it is assumed that all of the above near field communication adopts BLE. Because a relatively large proportion of mobile phones support a master mode of the BLE, the mobile terminal may be, for example, in the master mode of the BLE. Correspondingly, the machine may be in a slave mode of the BLE, and the mobile terminal actively initiates a connection establishment process. Certainly, on the contrary, the connection establishment process may also be actively initiated by the machine.

In this embodiment of the specification, some of the information (for example, the identity information, the DOI, etc.) that is exchanged in the above process may be time-sensitive, and is valid only within a time-limit range, and is invalid beyond the time-limit range, which may result in a failure of process execution. In this way, not only information security can be improved but also a risk brought by information leakage can be reduced.

In the method in FIG. 2, in an example in which the DOI is a QR code, even if a user has a plurality of QR codes, a mobile terminal of the user may adaptively display a QR code matching a current service, helping prevent the user from being confused when using the QR codes, thereby reducing difficulty of user operation, which is relatively convenient. In addition, the mobile terminal and the machine perform identity verification on each other, not only improving security when using the QR code but also helping prevent a user from practicing fraud when using the QR code.

Figure 3:
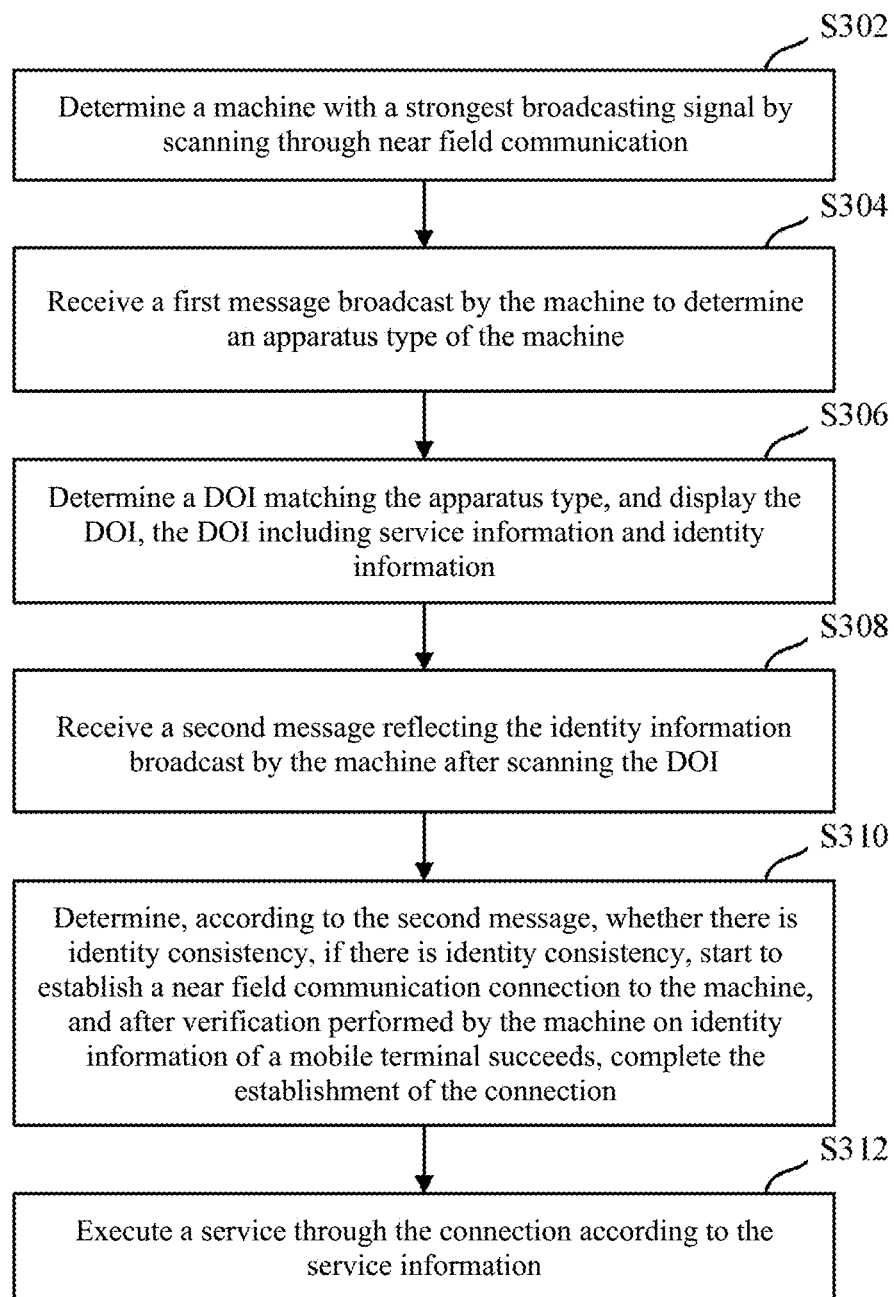
FIG. 3 is a flowchart of a service processing method from a perspective of a mobile terminal, according to an embodiment of the specification.

Based on a same concept, an embodiment of the specification further provides a schematic flowchart of a first service processing method from a perspective of a mobile terminal. As shown in FIG. 3, an execution body is the mobile terminal and related software on the mobile terminal. The process may include the following steps.

S302: A machine with a strongest broadcasting signal is determined by scanning through near field communication.

In this embodiment of the specification, a threshold may be preset. If all broadcasting signals of nearby machines are not greater than the threshold (for example, when the mobile terminal is far away from the machines, all of the broadcasting signals are weak), execution of a subsequent process may not be triggered, helping save resources of the mobile terminal.

S304: A first message broadcast by the machine is received to determine an apparatus type of the machine.

S306: A DOI matching the apparatus type is determined, and the DOI is displayed or a user is instructed to display the DOI, the DOI including service information and identity information.

S308: A second message reflecting the identity information broadcast by the machine after scanning the DOI is received.

S310: It is determined whether there is identity consistency according to the second message, if there is identity consistency, a near field communication connection to the machine starts to be established, and after verification performed by the machine on identity information of a mobile terminal succeeds, the establishment of the connection is completed.

S312: A service is executed through the connection according to the service information.

In the methods of FIG. 2 and FIG. 3, the mobile terminal may adaptively display, according to the apparatus type of the machine, a QR code matching the apparatus type, thereby helping prevent a user from being confused about usage of a plurality of QR codes, that is, relieve confusion about a plurality of QR codes. For the confusion about a plurality of QR codes, the specification further provides another solution, that is, a second service processing method described below from perspectives of the machine and the mobile terminal.

Figure 4:
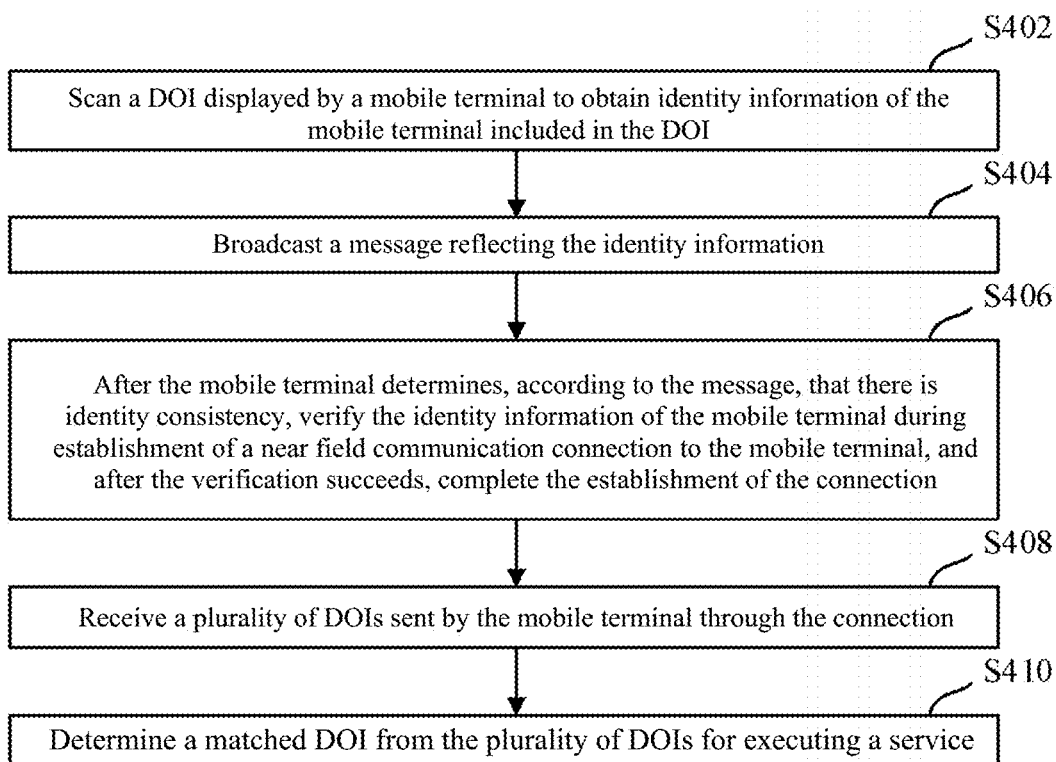
FIG. 4 is a flowchart of a service processing method from a perspective of a machine, according to an embodiment of the specification.

FIG. 4 is a schematic flowchart of a second service processing method from a perspective of a machine, according to an embodiment of the specification. An execution body is the machine and related software on the machine. Some steps in the process in FIG. 4 are the same as those in FIG. 2, and reference may be made to FIG. 2. Details are not repeated, but inconsistent steps are mainly described.

The process in FIG. 4 may include the following steps.

S402: A DOI displayed by a mobile terminal is scanned to obtain identity information of the mobile terminal included in the DOI.

S404: A message reflecting the identity information is broadcast.

S406: After the mobile terminal determines, according to the message, that there is identity consistency, the identity information of the mobile terminal is verified during establishment of a near field communication connection to the mobile terminal, and after the verification succeeds, the establishment of the connection is completed.

S408: A plurality of DOIs sent by the mobile terminal are received through the connection.

In this embodiment of the specification, the mobile terminal may not adaptively display a matched DOI, but may send a plurality of DOIs to the machine, and the machine adaptively selects a matched DOI. The mobile terminal may send DOIs in various forms. The mobile terminal may send the DOI itself, such as a QR code picture, etc., or may send only essential contents included in the DOI, as a result of that the essential content can represent the DOI, for example, code value information of the QR code, etc.

Further, Specific DOIs sent to the machine are not limited herein. In consideration of information security and privacy, applications corresponding to the DOIs may authorize each other, and then only a DOI of an authorized application is sent. Alternatively, a user may be allowed to perform voluntary configuration. For example, the user may forbid, in advance, the mobile terminal to send some DOIs to the machine as described in step S408.

S410: A matched DOI is determined from the plurality of DOIs for executing a service.

In this embodiment of the specification, the machine usually determines a DOI matching the machine from a plurality of DOIs for executing a service. For example, for a metro gate, the mobile terminal sends three QR codes to the metro gate, which are respectively used for taking a subway, taking a bus, and payment after consumption in a store. In this case, the metro gate determines a QR code used for taking the subway as a QR code with which the metro gate matches, and then the QR code is used to perform subway ticket check or execute a payment service, so as to help a user pass through the metro gate.

In the method in FIG. 4, in an example in which the DOI is a QR code, even if a user has a plurality of QR codes, the mobile terminal may send the plurality of QR codes to the machine, and the machine may adaptively display a QR code matching a current service, helping prevent the user from being confused when using the QR codes, thereby reducing difficulty of user operation, which is relatively convenient. In addition, the mobile terminal and the machine perform identity verification on each other, not only improving security when using the QR code but also helping prevent a user from practicing fraud when using the QR code.

Figure 5:
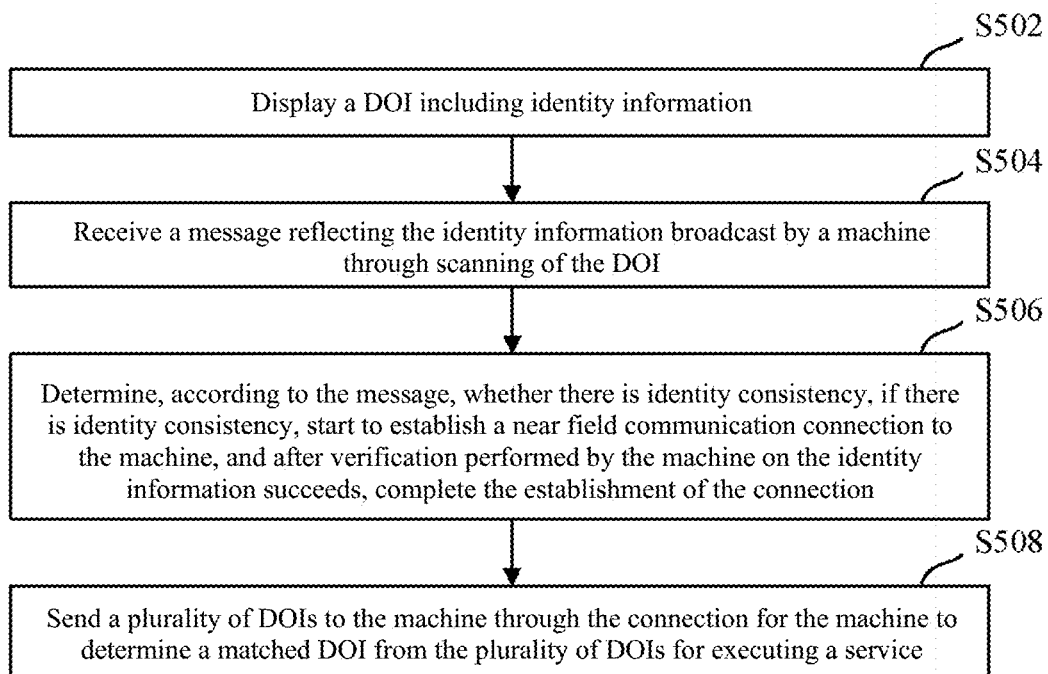
FIG. 5 is a flowchart of a service processing method from a perspective of a mobile terminal, according to an embodiment of the specification.

FIG. 5 is a schematic flowchart of a second service processing method from a perspective of a mobile terminal, according to an embodiment of the specification. An execution body is the mobile terminal and related software on the mobile terminal. Some steps in the process in FIG. 5 are the same as those in FIG. 3, and reference may be made to FIG. 3. Details are not repeated, but inconsistent steps are mainly described.

The process in FIG. 5 may include the following steps.

S502: A DOI including identity information is displayed.

S504: A message reflecting the identity information broadcast by a machine through scanning of the DOI is received.

S506: It is determine whether there is identity consistency according to the message, if there is identity consistency, a near field communication connection to the machine starts to be established, and after verification performed by the machine on the identity information succeeds, the establishment of the connection is completed.

S508: A plurality of DOIs are sent to the machine through the connection for the machine to determine a matched DOI from the plurality of DOIs for executing a service.

The two solutions that can be used to relieve confusion about a plurality of QR codes are respectively described above. It should be noted that in the above two solutions, mutual identity verification is performed. The mutual identity verification is mainly to improve information security and prevent users from practicing fraud. Therefore, in actual application, if only confusion about a plurality of QR codes needs to be relieved, mutual identity verification does not need to be performed, and only a corresponding step in the above solutions needs to be omitted.

Figure 6:
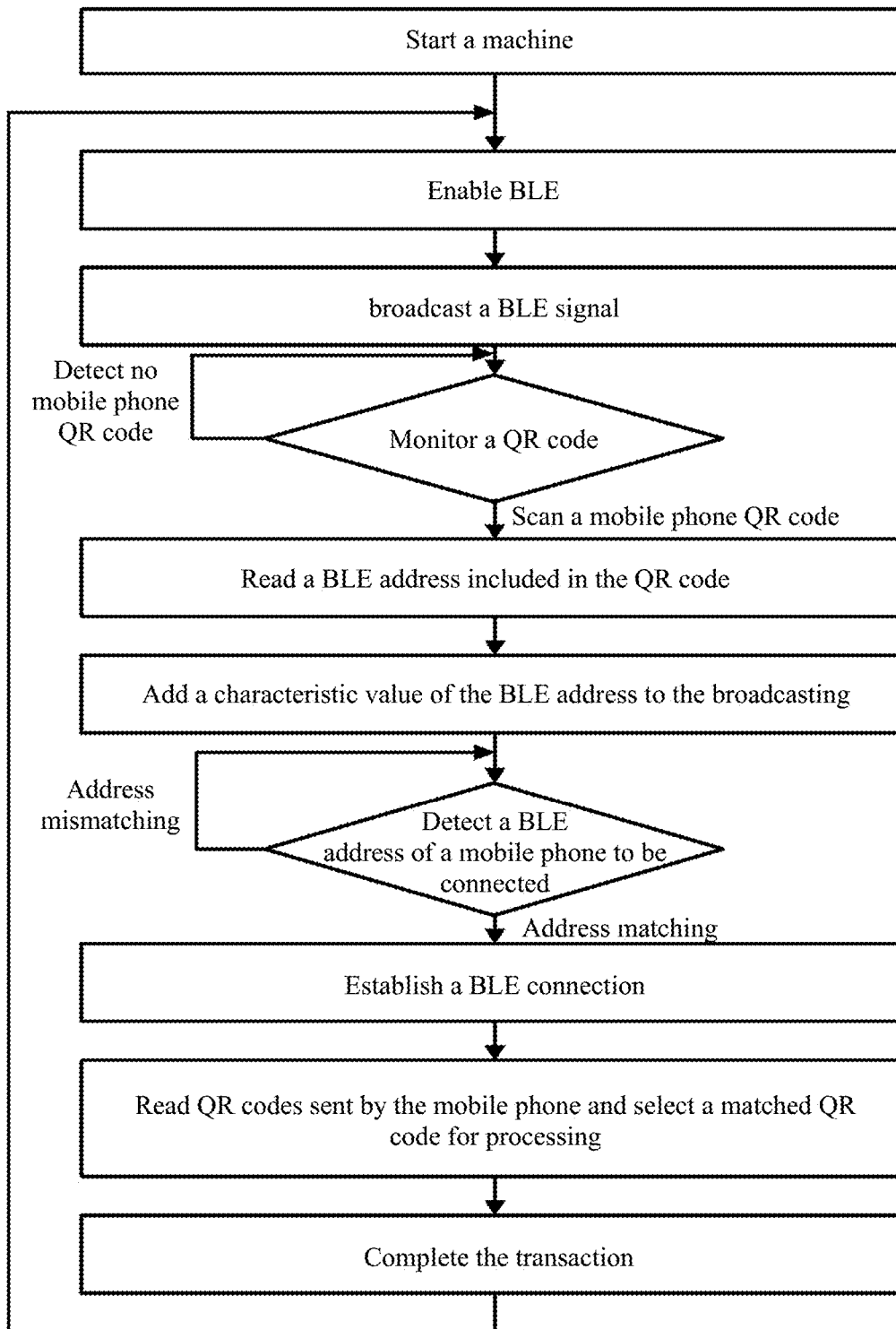
FIG. 6 is a flowchart of a service processing method from a perspective of a machine, according to an embodiment of the specification.
Figure 7:
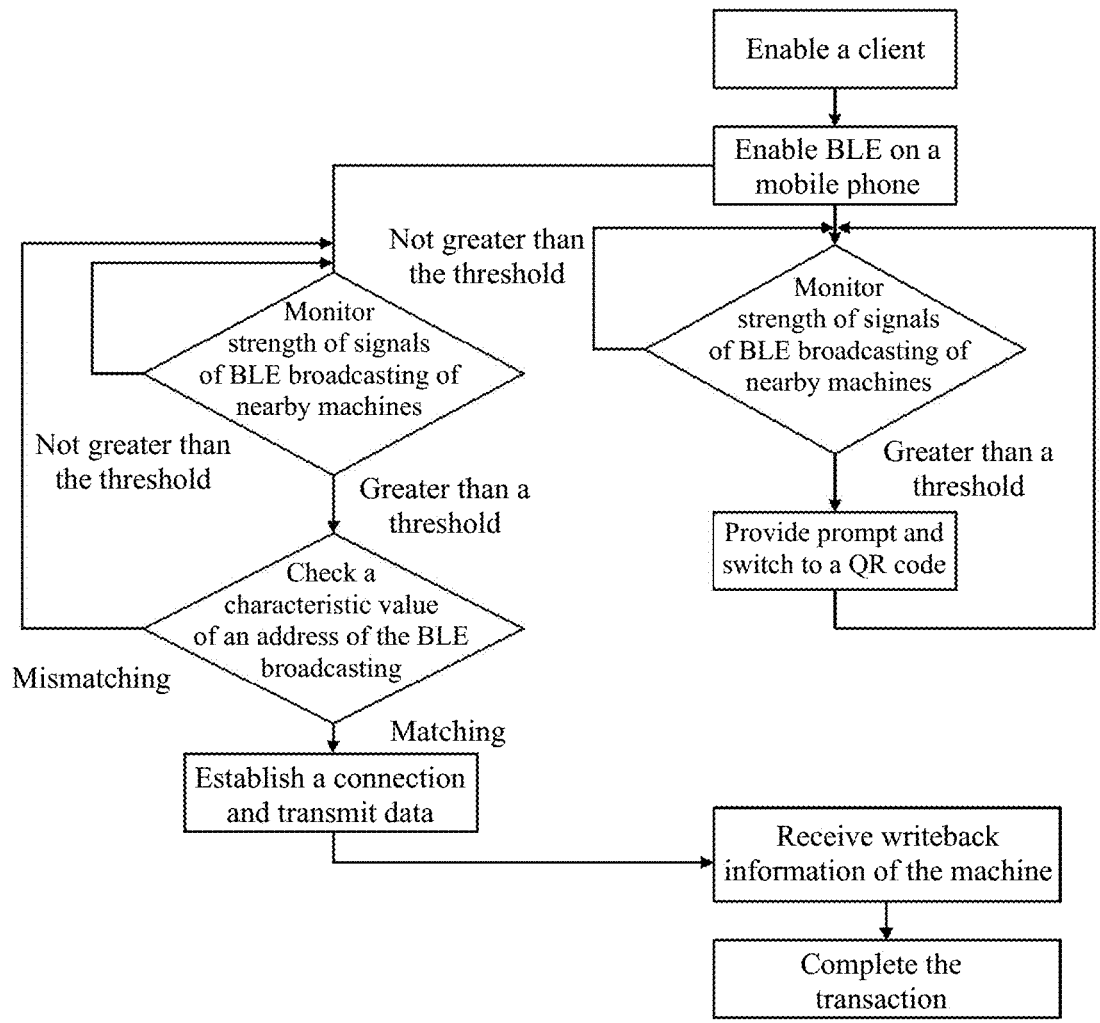
FIG. 7 is a flowchart of a service processing method from a perspective of a mobile terminal, according to an embodiment of the specification.

According to the previous descriptions, more intuitively, an embodiment of the specification further provides schematic diagrams of working processes of the machine and the mobile terminal in an implementation of the above service processing method in an actual application scenario, which are shown in FIG. 6 and FIG. 7. The mobile terminal is specifically a mobile phone, the DOI is specifically used for a QR code, the identity information is specifically a Bluetooth address, a service to be executed after a connection is specifically payment by a user to complete a transaction, and a matched DOI is a QR code for the payment. It should be noted that FIG. 6 and FIG. 7 are simple and incomplete processes. Some steps are omitted, which may be understood in combination with the previous descriptions.

FIG. 6 shows a working process of the machine, which mainly includes the following steps. The machine is started, and BLE is enabled. BLE signals are continuously broadcast, and a QR code is monitored. If a mobile phone QR code is scanned, a BLE address included in the QR code is read, and a characteristic value of the BLE address is added to the broadcasting. During connection establishment of the mobile phone, a BLE address of the mobile phone is detected to verify an identity of mobile phone. If there is address matching (that is, identity verification succeeds), a BLE connection is established, and QR codes sent by the mobile phone are read. A matched QR code is selected for completing the transaction.

FIG. 7 shows a working process of the mobile phone, which mainly includes the following steps. A client on the mobile phone is enabled (it is assumed that the solution is implemented on the client), the BLE is enabled, and strength of signals of BLE broadcasting of nearby machines is monitored. If the strength is greater than a threshold, a prompt is given and a QR code is switched. A characteristic value of an address of the BLE broadcasting is checked (the address is obtained by the machine by scanning the QR code displayed by the mobile phone), to determine whether the mobile phone is currently interacting with a correct machine. If yes, a connection is established to the machine for transmitting data and receiving writeback information of the machine after completion of the service, thereby completing the transaction.

Based on the same concept, an embodiment of the specification further provides a device corresponding to the foregoing service processing method, which is shown in FIG. 8 to FIG. 11.

Figure 8:
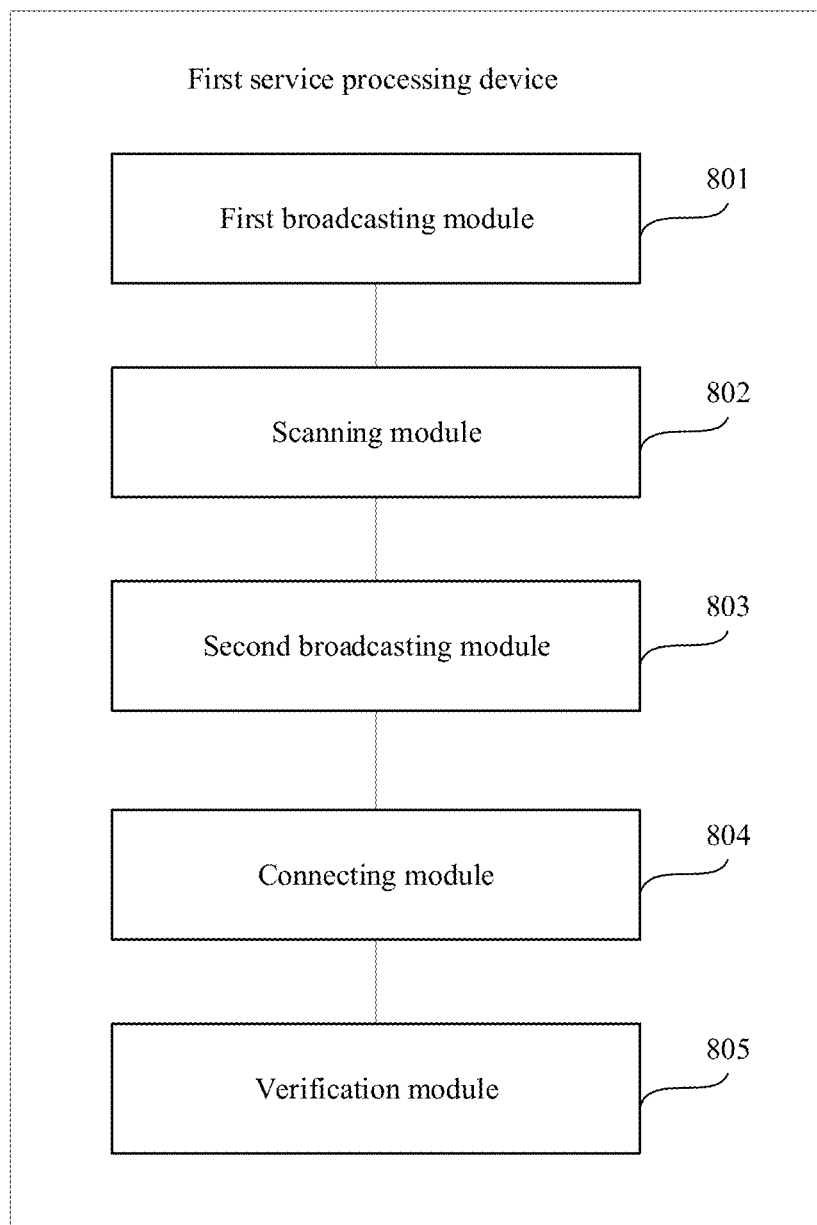
FIG. 8 is a block diagram of a first service processing device, according to an embodiment of the specification.

FIG. 8 is a schematic structural diagram of a service processing device corresponding to FIG. 2, according to an embodiment of the specification. The device is located on a machine. The device includes: a first broadcasting module 801, a scanning module 802, a second broadcasting module 803, a connecting module 804, and a service module 805.

The first broadcasting module 801 is configured to broadcast a first message including an apparatus type through near field communication.

The scanning module 802 is configured to scan a DOI that is displayed by a mobile terminal according to the first message and that matches the apparatus type, to obtain service information and identity information of the mobile terminal that are included in the DOI.

The second broadcasting module 803 is configured to broadcast a second message reflecting the identity information.

The connecting module 804 is configured to: after the mobile terminal determines, according to the second message, that there is identity consistency verify the identity information of the mobile terminal during establishment of a near field communication connection to the mobile terminal, and after the verification succeeds, complete the establishment of the connection.

The service module 805 is configured to execute a service through the connection according to the service information.

In some embodiments, that the second broadcasting module 803 broadcasts the second message reflecting the identity information specifically includes: performing, by the second broadcasting module 803, a cryptographic operation on the identity information to obtain a characteristic value reflecting the identity information; and broadcasting the second message including the characteristic value.

In some embodiments, the near field communication includes Bluetooth low energy (BLE), and the identity information includes a Bluetooth physical address.

In some embodiments, the mobile terminal is in a master mode of the BLE.

Figure 9:
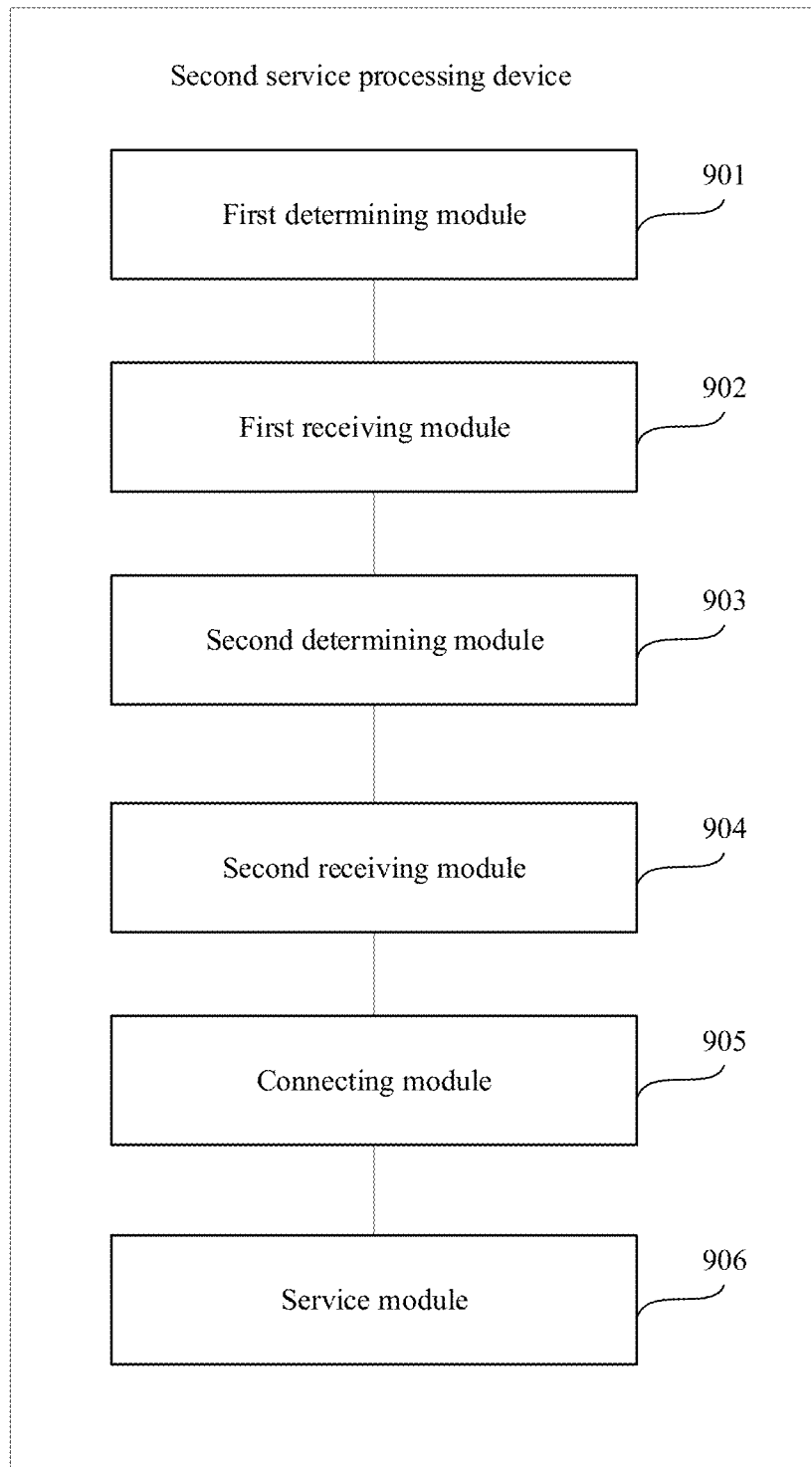
FIG. 9 is a block diagram of a second service processing device, according to an embodiment of the specification.

FIG. 9 is a schematic structural diagram of a service processing device corresponding to FIG. 3, according to an embodiment of the specification. The device is located on a mobile terminal. The device includes: a first determining module 901, a first receiving module 902, a second determining module 903, a second receiving module 904, a connecting module 905, and a service module 906.

The first determining module 901 is configured to determine a machine with a strongest broadcasting signal by means of scanning through near field communication.

The first receiving module 902 is configured to receive a first message broadcast by the machine to determine an apparatus type of the machine.

The second determining module 903 is configured to determine a DOI matching the apparatus type, and display or instruct a user to display the DOI, the DOI including service information and identity information.

The second receiving module 904 is configured to receive a second message reflecting the identity information broadcast by the machine after scanning the DOI.

The connecting module 905 is configured to: determine whether there is identity consistency according to the second message, if there is identity consistency, start to establish a near field communication connection to the machine, and after verification performed by the machine on identity information of a mobile terminal succeeds, complete the establishment of the connection.

The service module 906 is configured to execute a service through the connection according to the service information.

In some embodiments, the near field communication includes Bluetooth low energy (BLE), and the identity information includes a Bluetooth physical address.

In some embodiments, the machine is in a slave mode of the BLE.

Figure 10:
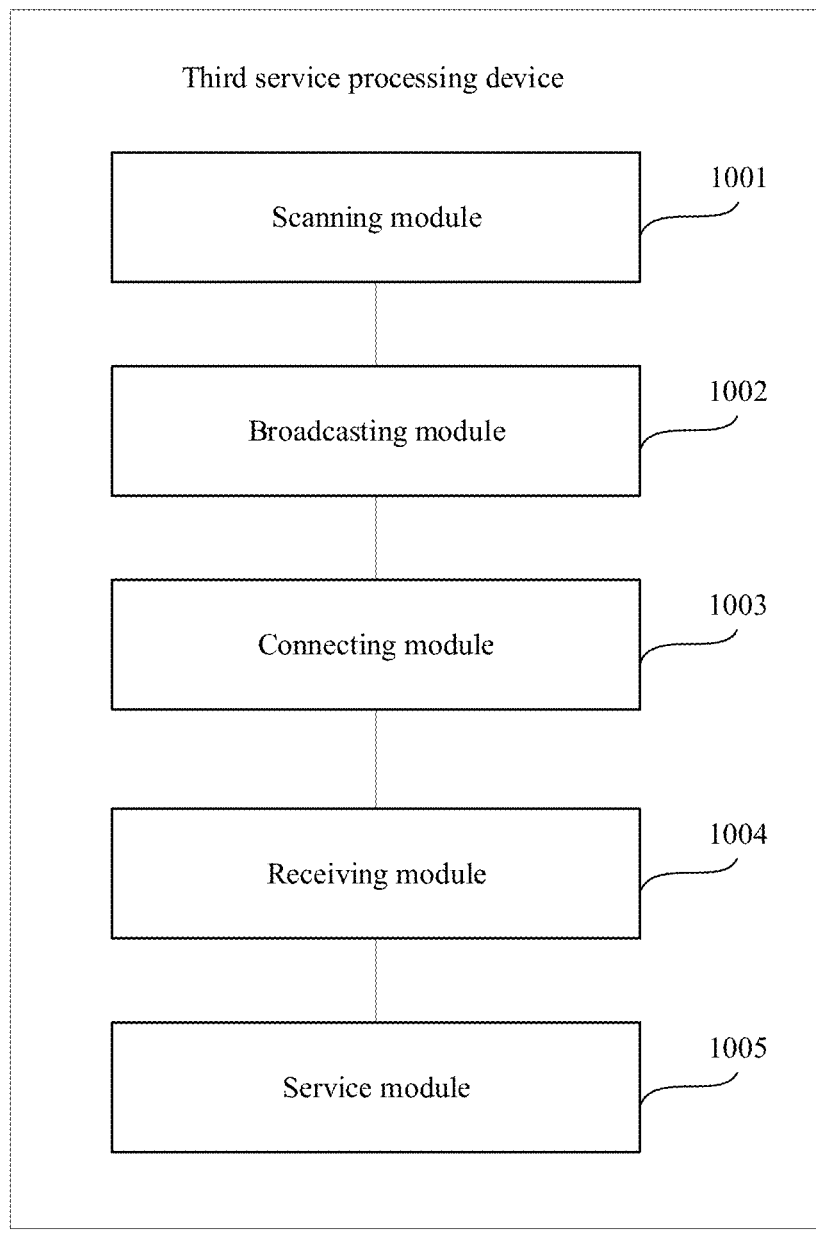
FIG. 10 is a block diagram of a third service processing device, according to an embodiment of the specification.

FIG. 10 is a schematic structural diagram of a service processing device corresponding to FIG. 4, according to an embodiment of the specification. The device is located on a machine. The device includes: a scanning module 1001, a broadcasting module 1002, a connecting module 1003, a receiving module 1004, and a service module 1005.

The scanning module 1001 is configured to scan a DOI displayed by a mobile terminal to obtain identity information of the mobile terminal included in the DOI.

The broadcasting module 1002 is configured to broadcast a message reflecting the identity information.

The connecting module 1003 is configured to: after the mobile terminal determines, according to the message, that there is identity consistency, verify the identity information of the mobile terminal during establishment of a near field communication connection to the mobile terminal, and after the verification succeeds, complete the establishment of the connection.

The receiving module 1004 is configured to receive a plurality of DOIs sent by the mobile terminal through the connection.

The service module 1005 is configured to determine a matched DOI from the plurality of DOIs for executing a service.

Figure 11:
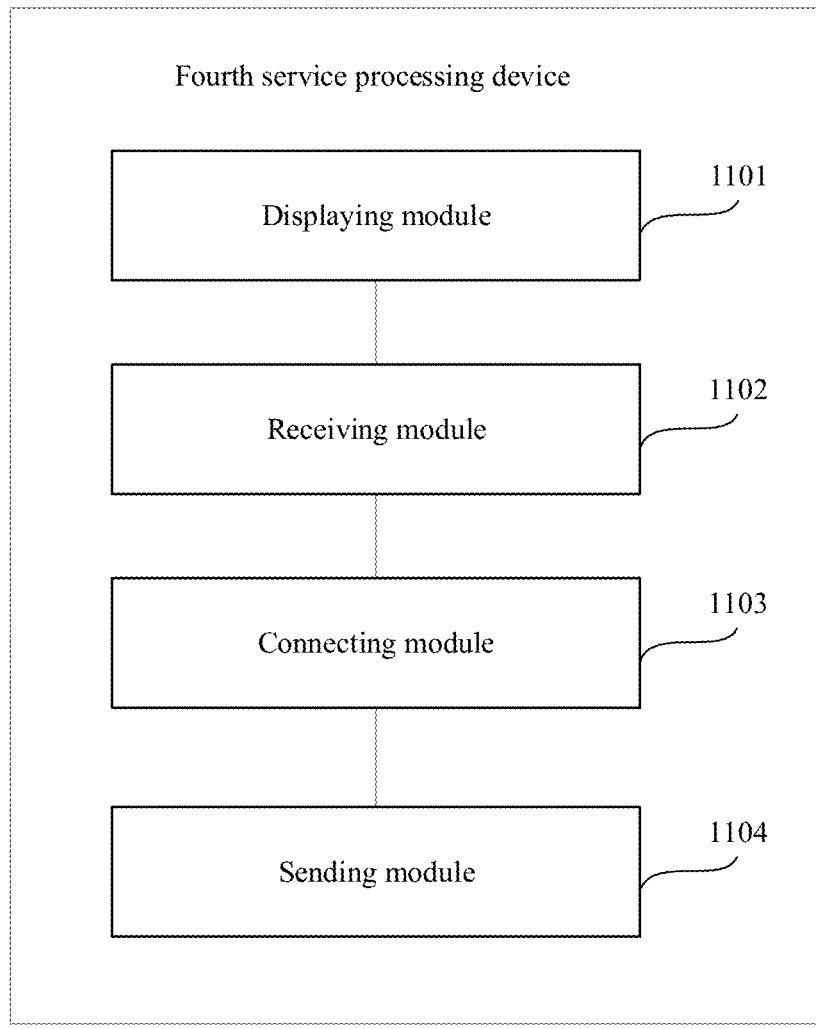
FIG. 11 is a block of a fourth service processing device, according to an embodiment of the specification.

FIG. 11 is a schematic structural diagram of a service processing device corresponding to FIG. 5, according to an embodiment of the specification. The device is located on a mobile terminal. The device includes: a displaying module 1101, a receiving module 1102, a connecting module 1103, and a sending module 1104.

The displaying module 1101 is configured to display a DOI including identity information.

The receiving module 1102 is configured to receive a message reflecting the identity information broadcast by a machine through scanning of the DOI.

The connecting module 1103 is configured to: determine whether there is identity consistency according to the message, if there is identity consistency, start to establish a near field communication connection to the machine, and after verification performed by the machine on the identity information succeeds, complete the establishment of the connection.

The sending module 1104 is configured to send a plurality of DOIs to the machine through the connection for the machine to determine a matched DOI from the plurality of DOIs for executing a service.

Based on a same concept, an embodiment of the specification further provides a service processing apparatus corresponding to FIG. 2, including: at least one processor and a memory communicatively connected to the at least one processor. The memory stores instructions executable by the at least one processor, where execution of the instructions by the at least one processor causes the at least one processor to: broadcast a first message including an apparatus type through near field communication; scan a DOI that is displayed by a mobile terminal according to the first message and that matches the apparatus type, to obtain service information and identity information of the mobile terminal that are included in the DOI; broadcast a second message reflecting the identity information; after the mobile terminal determines, according to the second message, that there is identity consistency, verify the identity information of the mobile terminal during establishment of a near field communication connection to the mobile terminal, and after the verification succeeds, complete the establishment of the connection; and execute a service through the connection according to the service information.

Based on a same concept, an embodiment of the specification further provides a service processing apparatus corresponding to FIG. 3, including: at least one processor and a memory communicatively connected to the at least one processor. The memory stores instructions executable by the at least one processor, where execution of the instructions by the at least one processor causes the at least one processor to: determine a machine with a strongest broadcasting signal by means of scanning through near field communication; receive a first message broadcast by the machine to determine an apparatus type of the machine; determine a DOI matching the apparatus type, and display or instruct a user to display the DOI, the DOI including service information and identity information; receive a second message reflecting the identity information broadcast by the machine after scanning the DOI; determine whether there is identity consistency according to the second message, if there is identity consistency, start to establish a near field communication connection to the machine, and after verification performed by the machine on identity information of a mobile terminal succeeds, complete the establishment of the connection; and execute a service through the connection according to the service information.

Based on a same concept, an embodiment of the specification further provides a service processing apparatus corresponding to FIG. 4, including: at least one processor and a memory communicatively connected to the at least one processor. The memory stores instructions executable by the at least one processor, where execution of the instructions by the at least one processor causes the at least one processor to: scan a DOI displayed by a mobile terminal to obtain identity information of the mobile terminal included in the DOI; broadcast a message reflecting the identity information; after the mobile terminal determines, according to the message, that there is identity consistency, verify the identity information of the mobile terminal during establishment of a near field communication connection to the mobile terminal, and after the verification succeeds, complete the establishment of the connection; and receive a plurality of DOIs sent by the mobile terminal through the connection; and determine a matched DOI from the plurality of DOIs for executing a service.

Based on a same concept, an embodiment of the specification further provides a service processing apparatus corresponding to FIG. 5, including: at least one processor and a memory communicatively connected to the at least one processor. The memory stores instructions executable by the at least one processor, where execution of the instructions by the at least one processor causes the at least one processor to: display a DOI including identity information; receive a message reflecting the identity information broadcast by a machine through scanning of the DOI; determine whether there is identity consistency according to the message, if there is identity consistency, start to establish a near field communication connection to the machine, and after verification performed by the machine on the identity information succeeds, complete the establishment of the connection; and send a plurality of DOIs to the machine through the connection for the machine to determine a matched DOI from the plurality of DOIs for executing a service.

Based on a same concept, an embodiment of the specification further provides a non-volatile computer storage medium corresponding to FIG. 2. The non-volatile computer storage medium stores computer-executable instructions set to: broadcast a first message including an apparatus type through near field communication; scan a DOI that is displayed by a mobile terminal according to the first message and that matches the apparatus type, to obtain service information and identity information of the mobile terminal that are included in the DOI; broadcast a second message reflecting the identity information; after the mobile terminal determines, according to the second message, that there is identity consistency, verify the identity information of the mobile terminal during establishment of a near field communication connection to the mobile terminal, and after the verification succeeds, complete the establishment of the connection; and execute a service through the connection according to the service information.

Based on a same concept, an embodiment of the specification further provides a non-volatile computer storage medium corresponding to FIG. 3. The non-volatile computer storage medium stores computer-executable instructions set to: determine a machine with a strongest broadcasting signal by means of scanning through near field communication; receive a first message broadcast by the machine to determine an apparatus type of the machine; determine a DOI matching the apparatus type, and display or instruct a user to display the DOI, the DOI including service information and identity information; receive a second message reflecting the identity information broadcast by the machine after scanning the DOI; determine whether there is identity consistency according to the second message, if there is identity consistency, start to establish a near field communication connection to the machine, and after verification performed by the machine on identity information of a mobile terminal succeeds, complete the establishment of the connection; and execute a service through the connection according to the service information.

Based on a same concept, an embodiment of the specification further provides a non-volatile computer storage medium corresponding to FIG. 4. The non-volatile computer storage medium stores computer-executable instructions set to: scan a DOI displayed by a mobile terminal to obtain identity information of the mobile terminal included in the DOI; broadcast a message reflecting the identity information; after the mobile terminal determines, according to the message, that there is identity consistency, verify the identity information of the mobile terminal during establishment of a near field communication connection to the mobile terminal, and after the verification succeeds, complete the establishment of the connection; and receive a plurality of DOIs sent by the mobile terminal through the connection; and determine a matched DOI from the plurality of DOIs for executing a service.

Based on a same concept, an embodiment of the specification further provides a non-volatile computer storage medium corresponding to FIG. 5. The non-volatile computer storage medium stores computer-executable instructions set to: display a DOI including identity information; receive a message reflecting the identity information broadcast by a machine through scanning of the DOI; determine whether there is identity consistency according to the message, if there is identity consistency, start to establish a near field communication connection to the machine, and after verification performed by the machine on the identity information succeeds, complete the establishment of the connection; and send a plurality of DOIs to the machine through the connection for the machine to determine a matched DOI from the plurality of DOIs for executing a service.

Embodiments of the specification are described above. Other embodiments fall within the scope of the appended claims. In some embodiments, the actions or steps recorded in the claims may be performed in sequences different from those in the embodiments and an expected result may still be achieved. In addition, the processes depicted in the accompanying drawings do not necessarily require specific sequences or consecutive sequences to achieve an expected result. In some implementations, multitasking and parallel processing may be feasible or beneficial.

In the specification, the embodiments are described in a progressive manner. Reference may be made to each other for a same or similar part of the embodiments. Each embodiment focuses on a difference from other embodiments. Especially, an apparatus embodiment, a device embodiment, or a non-volatile computer storage medium embodiment is basically similar to a method embodiment, and therefore is described briefly; for related parts, refer to partial descriptions in the method embodiment.

The apparatus, the device, and the non-volatile computer storage medium provided in the embodiments of the specification correspond to the method, so that the apparatus, the device, and the non-volatile computer storage medium also have beneficial technical effects similar to those of the corresponding method. Since the beneficial technical effects of the method have been described in detail above, the beneficial technical effects of the corresponding apparatus, device, and non-volatile computer storage medium are not described herein again.

In the 1990s, improvements of a technology can be clearly distinguished between hardware improvements (for example, improvements to a circuit structure such as a diode, a transistor, a switch, etc.) and software improvements (improvements to a method procedure). However, with the development of technology, improvements of many method procedures can be considered as direct improvements of hardware circuit structures. Designers almost all program an improved method procedure to a hardware circuit, to obtain a corresponding hardware circuit structure. Therefore, it does not mean that the improvement of a method procedure cannot be implemented by using a hardware entity module. For example, a programmable logic device (PLD) such as a field programmable gate array (FPGA) is a type of integrated circuit whose logic function is determined by a user by programming the device. The designers perform voluntary programming to "integrate" a digital system into a single PLD without requiring a chip manufacturer to design and prepare a dedicated integrated circuit chip. In addition, instead of making an integrated circuit chip manually, the programming is mostly implemented by using logic compiler software, which is similar to the software compiler used to write programs. Original code before compiling is also written in a specific programming language, which is referred to as Hardware Description Language (HDL). There are many types of HDLs, such as Advanced Boolean Expression Language (ABEL), Altera Hardware Description Language (AHDL), Confluence, Cornell University Programming Language (CUPL), HDCal, Java Hardware Description Language (JHDL), Lava, Lola, MyHDL, PALASM, Ruby Hardware Description Language (RHDL), etc. Currently, Very-High-Speed Integrated Circuit Hardware Description Language (VHDL) and Verilog are most commonly used. A person skilled in the art should also understand that as long as a method procedure is logically programmed and then programmed to an integrated circuit by using the foregoing hardware description languages, a hardware circuit that implements the logical method procedure can be easily obtained.

The controller can be implemented in any suitable manner, for example, the controller can take the form of, for example, a microprocessor or processor and a computer-readable medium storing computer-readable program code (for example, software or firmware) executable by the processor, a logic gate, a switch, an application-specific integrated circuit (ASIC), a programmable logic controller and an embedded microcontroller. Examples of the controller include, but are not limited to, the following microcontrollers: ARC 625D, Atmel AT91SAM, Microchip PIC18F26K20 and Silicone Labs C8051F320. The memory controller can also be implemented as part of the memory control logic. A person skilled in the art will also appreciate that, in addition to implementing the controller in the form of pure computer-readable program code, it is also possible to implement the controller in the form of a logic gate, switch, application-specific integrated circuit, programmable logic controller, and embedded microcontroller and other forms to achieve the same function. Such a controller can thus be considered as a hardware component and apparatuses included therein for implementing various functions can also be considered as structures inside the hardware component. Alternatively, apparatuses configured to implement various functions can be considered as both software modules implementing the method and structures inside the hardware component.

The system, the apparatus, the module or the unit described in the foregoing embodiments can be specifically implemented by a computer chip or an entity or implemented by a product having a certain function. A typical implementation device is a computer. Specifically, the computer can be, for example, a personal computer, a laptop computer, a cellular phone, a camera phone, a smartphone, a personal digital assistant, a media player, a navigation device, an email device, a game console, a tablet computer, a wearable device, or a combination of any of these devices.

For ease of description, the foregoing apparatus is described by dividing functions into various units. Certainly, in implementation of the specification, the function of the units may be implemented in a same piece of or multiple pieces of software and/or hardware.

A person skilled in the art should understand that the embodiments of the specification may be provided as a method, a system, or a computer program product. Therefore, the embodiments of the specification may use a form of hardware only embodiments, software only embodiments, or embodiments with a combination of software and hardware. Moreover, the embodiments of the specification may use a form of a computer program product that is implemented on one or more computer-usable storage media (including but not limited to a disk memory, a CD-ROM, an optical memory, and the like) that include computer-usable program code.

The specification is described with reference to flowcharts and/or block diagrams of the method, the device (system), and the computer program product in the embodiments of the specification. It should be understood that computer program instructions may be used to implement each process and/or each block in the flowcharts and/or block diagrams and a combination of a process and/or a block in the flowcharts and/or the block diagrams. These computer program instructions may be provided to a general-purpose computer, a dedicated computer, an embedded processor, or a processor of another programmable data processing device to generate a machine, so that the instructions executed by the computer or the processor of the another programmable data processing device generate an apparatus for implementing a specified function in one or more processes in the flowcharts and/or in one or more blocks in the block diagrams.

These computer program instructions may also be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the other programmable devices, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more processors (CPU), an input/output interface, a network interface, and a memory.

The memory may include the following forms of computer readable media: a non-persistent memory, a random access memory (RAM), and/or a non-volatile memory, for example, a read-only memory (ROM) or a flash memory (flash RAM). The memory is an example of a computer readable medium.

The computer readable media include persistent and non-persistent, and mobile and non-mobile media, and information storage may be implemented by using any method or technology. The information may be a computer readable instruction, a data structure, a program module, or other data. Examples of computer storage media include but are not limited to a phase change memory (PRAM), a static random access memory (SRAM), a dynamic random access memory (DRAM), other type of random access memory (RAM), a read-only memory (ROM), an electrically erasable programmable read-only memory (EEPROM), a flash memory or other memory technology, a compact disc read-only memory (CD-ROM), a digital versatile disc (DVD) or other optical storage, a cassette magnetic tape, tape and disk storage or other magnetic storage device or any other non-transmission media that may be configured to store information that a computing device can access. Based on the definition in the present disclosure, the computer-readable medium does not include transitory computer readable media (transitory media), such as a modulated data signal and a carrier.

It should also be noted that the terms "include," "comprise" and any other variants mean to cover the non-exclusive inclusion. Thereby, the process, method, article, or device which include a series of elements not only include those elements, but also include other elements which are not clearly listed, or include the inherent elements of the process, method, article and device. Without further limitation, the element defined by a phrase "include one" does not exclude other same elements in the process, method, article or device which include the element.

A person skilled in the art should understand that the embodiments of the specification may be provided as a method, a system, or a computer program product. Therefore, the specification may use a form of a complete hardware embodiment, a complete software embodiment, or an embodiment combining software and hardware. Moreover, the specification may use a form of a computer program product that is implemented on one or more computer-usable storage media (including but not limited to a disk memory, a CD-ROM, an optical memory, and the like) that include computer-usable program code.

The specification can be described in the general context of computer-executable instructions executed by a computer, for example, a program module. Generally, the program unit includes a routine, a program, an object, a component, a data structure, and the like for executing a particular task or implementing a particular abstract data type. The specification may also be practiced in distributed calculating environments in which tasks are performed by remote processing devices that are connected through a communications network. In a distributed calculating environment, program modules may be located in both local and remote computer storage media including storage devices.

In the specification, the embodiments are described in a progressive manner. Reference may be made to each other for a same or similar part of the embodiments. Each embodiment focuses on a difference from other embodiments. Especially, the system embodiment is basically similar to the method embodiments, and therefore is briefly described. For a relevant part, reference may be made to the description in the part of the method embodiments.

The foregoing descriptions are merely embodiments of the specification and are not intended to limit the specification. For a person skilled in the art, various modifications and variations can be made to the specification. Any modification, equivalent replacement, or improvement made without departing from the spirit and principle of the specification shall fall within the scope of the claims of the specification.

What is claimed is:

1. A method, comprising:
broadcasting, by an electronic device, a first message comprising an apparatus type through near field communication;
scanning, by the electronic device, a digital object identifier (DOI) that is displayed by a mobile terminal according to the first message and that matches the apparatus type, to obtain service information and identity information of the mobile terminal included in the DOI;
broadcasting, by the electronic device, a second message generated based on the identity information;
obtaining, by the electronic device from the mobile terminal, a request for a near field communication connection, wherein the request is generated by the mobile terminal after the mobile terminal determines the second message includes information consistent with the identity information of the mobile terminal;
verifying, by the electronic device, the request based on the identity information of the mobile terminal;
in response to that the verification succeeds, establishing, by the electronic device, the near field communication connection to the mobile terminal; and
executing, by the electronic device, a service through the near field communication connection according to the service information, by:
obtaining, by the electronic device, a plurality of DOIs from the mobile terminal via the near field communication connection; and
selecting, by the electronic device, one of the DOIs that is consistent with the service provided by the electronic device; and
executing, by the electronic device, the service based on the selected DOI.

2. The method according to claim 1, wherein the broadcasting, by the electronic device, a second message generated based on the identity information comprises:
encrypting, by the electronic device, the identity information included in the DOI to obtain a characteristic value reflecting the identity information; and
broadcasting, by the electronic device, the second message that includes the characteristic value.

3. The method according to claim 1, wherein the near field communication connection is established based on Bluetooth Low Energy (BLE) protocol, and the identity information of the mobile terminal comprises a Bluetooth physical address.

4. The method according to claim 3, wherein the mobile terminal is in a master mode of the BLE protocol.

5. The method according to claim 1, wherein the DOI comprises a QR code.

6. A method, comprising:
determining, by a mobile terminal, an electronic device with a strongest broadcasting signal by scanning with near field communication;
receiving, by the mobile terminal, a first message from an electronic device to determine an apparatus type of the electronic device;
determining, by the mobile terminal, a digital object identifier (DOI) matching the apparatus type;
displaying, by the mobile terminal, the DOI, the DOI comprising service information and identity information of the mobile terminal;
receiving, by the mobile terminal, a second message broadcast by the electronic device after the electronic device scans the DOI, wherein the second message includes information indicating identity information;
determining, by the mobile terminal, whether the information indicating identity information included in the second message is consistent with the identity information of the mobile terminal;
in response to determining that the information indicating identity information included in the second message is consistent with the identity information of the mobile terminal, establishing, by the mobile terminal, a near field communication connection to the electronic device; and
transmitting, by the mobile terminal, a service request including the service information to the electronic device via the near field communication connection to enable the electronic device to execute a service based on the service information.

7. The method according to claim 6, wherein the near field communication connection is established based on Bluetooth low energy (BLE) protocol, and the identity information of the mobile terminal comprises a Bluetooth physical address.

8. The method according to claim 7, wherein the electronic device is in a slave mode of the BLE protocol.

9. An apparatus comprising:
one or more processors; and
a memory storing instructions executable by the one or more processors to cause the one or more processors to perform operations comprising:
broadcasting a first message comprising an apparatus type through near field communication;
scanning a digital object identifier (DOI) that is displayed by a mobile terminal according to the first message and that matches the apparatus type, to obtain service information and identity information of the mobile terminal included in the DOI;
broadcasting a second message generated based on the identity information;
obtaining, from the mobile terminal, a request for a near field communication connection, wherein the request is generated by the mobile terminal after the mobile terminal determines the second message includes information consistent with the identity information of the mobile terminal;
verifying the request based on the identity information of the mobile terminal;

in response to that the verification succeeds, establishing the near field communication connection to the mobile terminal; and executing a service through the near field communication connection according to the service information, by:
obtaining a plurality of DOIs from the mobile terminal via the near field communication connection; and
selecting one of the DOIs that is consistent with the service provided by the apparatus; and
executing the service based on the selected DOI.

10. The apparatus according to claim 9, wherein the broadcasting a second message generated based on the identity information comprises:
encrypting the identity information included in the DOI to obtain a characteristic value reflecting the identity information; and
broadcasting the second message that includes the characteristic value.

11. The apparatus according to claim 9, wherein the near field communication connection is established based on Bluetooth Low Energy (BLE) protocol, and the identity information of the mobile terminal comprises a Bluetooth physical address.

12. The apparatus according to claim 11, wherein the mobile terminal is in a master mode of the BLE protocol.

13. The apparatus according to claim 9, wherein the DOI comprises a QR code.

14. One or more non-transitory computer-readable storage media configured with instructions executable by one or more processors to cause the one or more processors to perform operations comprising:
broadcasting a first message comprising an apparatus type through near field communication;
scanning a digital object identifier (DOI) that is displayed by a mobile terminal according to the first message and that matches the apparatus type, to obtain service information and identity information of the mobile terminal included in the DOI;
broadcasting a second message generated based on the identity information;
obtaining, from the mobile terminal, a request for a near field communication connection, wherein the request is generated by the mobile terminal after the mobile terminal determines the second message includes information consistent with the identity information of the mobile terminal;
verifying the request based on the identity information of the mobile terminal;
in response to that the verification succeeds, establishing the near field communication connection to the mobile terminal; and
executing a service through the near field communication connection according to the service information, by:
obtaining a plurality of DOIs from the mobile terminal via the near field communication connection; and
selecting one of the DOIs that is consistent with the service provided by the one or more processors; and
executing the service based on the selected DOI.

15. The one or more non-transitory computer-readable storage media according to claim 14, wherein the broadcasting a second message generated based on the identity information comprises:
encrypting the identity information included in the DOI to obtain a characteristic value reflecting the identity information; and
broadcasting the second message that includes the characteristic value.

16. The one or more non-transitory computer-readable storage media according to claim 14, wherein the near field communication connection is established based on Bluetooth Low Energy (BLE) protocol, and the identity information of the mobile terminal comprises a Bluetooth physical address.

17. The one or more non-transitory computer-readable storage media according to claim 16, wherein the mobile terminal is in a master mode of the BLE protocol.

18. The one or more non-transitory computer-readable storage media according to claim 14, wherein the DOI comprises a QR code.

* * * * *